United States Patent
Blank et al.

(10) Patent No.: US 12,546,381 B2
(45) Date of Patent: Feb. 10, 2026

(54) COUPLING ARRANGEMENT

(71) Applicant: SACS AEROSPACE GMBH, Empfingen (DE)

(72) Inventors: Eugen Blank, Bösingen (DE); Roland Moser, Obernheim (DE)

(73) Assignee: SACS Aerospace GmbH, Empfingen (DE)

( * ) Notice: Subject to any disclaimer, the term of this patent is extended or adjusted under 35 U.S.C. 154(b) by 274 days.

(21) Appl. No.: 18/255,274

(22) PCT Filed: Nov. 25, 2021

(86) PCT No.: PCT/EP2021/082943
§ 371 (c)(1),
(2) Date: May 31, 2023

(87) PCT Pub. No.: WO2022/117423
PCT Pub. Date: Jun. 9, 2022

(65) Prior Publication Data
US 2024/0003407 A1     Jan. 4, 2024

(30) Foreign Application Priority Data
Dec. 2, 2020   (DE) ...................... 10 2020 215 229.2

(51) Int. Cl.
*F16D 1/06*   (2006.01)
*F16G 11/12*  (2006.01)

(52) U.S. Cl.
CPC ................... *F16G 11/12* (2013.01)

(58) Field of Classification Search
CPC ...................................................... F16G 11/12
See application file for complete search history.

(56) References Cited

U.S. PATENT DOCUMENTS

| 436,357 | A | * | 9/1890 | King | F16B 2/065 |
| | | | | | 411/436 |
| 1,481,062 | A | * | 1/1924 | Lloyd | F16L 21/007 |
| | | | | | 285/373 |

(Continued)

FOREIGN PATENT DOCUMENTS

| CH | 335217 A | * | 12/1958 |
| DE | 592029 C | * | 1/1934 |

(Continued)

OTHER PUBLICATIONS

International Search Report issued in International Application No. PCT/EP2021/082943, Mar. 16, 2022, 2 pages.

(Continued)

*Primary Examiner* — Jason W San
(74) *Attorney, Agent, or Firm* — HSML P.C.

(57) ABSTRACT

A coupling arrangement for connecting components, including a first and a second coupling part, where an end portion of the first coupling part is provided with an internal thread and an end portion of the second coupling part is provided with an external thread which is screwed into the internal thread of the first coupling part. A clamping sleeve is rotatably received on an outer surface of the end portion of the first coupling part, in which an inner surface of the clamping sleeve and the outer surface of the end portion of the first coupling part each have latch geometries which deviate from a circular geometry to provide, during a rotational movement of the clamping sleeve relative to the end portion of the first coupling part, an at least regionally elastic or elastic and plastic change in diameter for clamping the end portion of the second coupling part.

9 Claims, 3 Drawing Sheets

(56) References Cited

U.S. PATENT DOCUMENTS

| | | | | |
|---|---|---|---|---|
| 3,419,227 | A * | 12/1968 | Mccarthy | B65H 75/08 279/6 |
| 3,583,039 | A * | 6/1971 | Walker | A44B 1/22 24/113 MP |
| 3,643,296 | A * | 2/1972 | Kahn | A44B 1/28 24/108 |
| 3,644,965 | A * | 2/1972 | Kahn | A44B 1/28 24/108 |
| 5,427,468 | A * | 6/1995 | Muellenberg | F16D 1/04 403/350 |
| 8,061,923 | B2 * | 11/2011 | Simmons | F16D 1/108 403/348 |
| 9,756,930 | B2 * | 9/2017 | Hanchett | A45F 5/02 |
| 9,961,966 | B2 * | 5/2018 | Ryan | A44B 1/14 |
| 9,964,155 | B2 * | 5/2018 | Goetz | F16D 1/0817 |
| 10,730,118 | B2 * | 8/2020 | Haimer | B23B 31/1115 |
| 2002/0001504 | A1 * | 1/2002 | McCallion | F16B 33/006 403/374.3 |
| 2011/0253956 | A1 | 10/2011 | Smetz et al. | |
| 2014/0130299 | A1 * | 5/2014 | Jaranson | E05F 1/1215 16/50 |
| 2015/0121667 | A1 * | 5/2015 | Humpert | A44B 17/0064 29/525 |
| 2016/0338455 | A1 * | 11/2016 | Chuan | A44B 19/305 |
| 2017/0119108 | A1 * | 5/2017 | Schlick | A44B 99/005 |
| 2021/0396273 | A1 * | 12/2021 | Blank | F16G 11/12 |

FOREIGN PATENT DOCUMENTS

| | | | |
|---|---|---|---|
| DE | 296 16 666 U | 3/1997 | |
| DE | 202009016397 U1 * | 3/2010 | F16G 11/12 |
| EP | 1588975 A2 * | 10/2005 | B66B 7/08 |
| EP | 2 378 158 | 10/2011 | |
| EP | 3 647 607 | 5/2020 | |
| WO | 2009/140893 | 11/2009 | |

OTHER PUBLICATIONS

Office Action issued in corresponding German Patent Application No. 10 2020 215 229.2, Aug. 5, 2021, 10 pages.

* cited by examiner

COUPLING ARRANGEMENT

The invention relates to a coupling arrangement for connecting components, having a first coupling part to be secured to a first component, and having a second coupling part to be secured to a second component, wherein an end portion of the first coupling part is provided with an internal thread extending along a thread axis, and an end portion of the second coupling part being provided with an external thread extending along the thread axis, which external thread of the second coupling part is screwed into the internal thread of the first coupling part.

BACKGROUND

A coupling device for force-transmitting coupling of two components is known from EP 3 647 607 A1. The known coupling device comprises a first coupling part having a first coupling interface, a second coupling part having a second coupling interface, and a coupling rod which is connected to the first coupling part by a first end region rotatably movable about an axis of rotation and to the second coupling part by a second end region rotatably movable about the axis of rotation, wherein the first end region and the first coupling part form a first threaded arrangement for setting a distance between the first coupling part and the second coupling part, and wherein it is provided that the first threaded arrangement is associated with a first braking device which is designed for, in particular exclusively, frictionally engaged braking torque transmission between the first coupling part and the first end region.

SUMMARY

The task of the invention is to provide a coupling arrangement with a simplified structure.

This task is solved for a coupling arrangement of the type mentioned above in that a clamping sleeve is rotatably received on an outer surface of the end portion of the first coupling part, wherein an inner surface of the clamping sleeve and the outer surface of the end portion of the first coupling part each have latch geometries deviating from a circular geometry and corresponding to one another in a cross-sectional plane aligned transversely to the thread axis to provide during a rotational movement of the clamping sleeve relative to the end portion of the first coupling part, an at least regionally elastic or elastic and plastic change in diameter of the end portion of the first coupling part for clamping the end portion of the second coupling part.

According to the invention, at least two latch geometries are formed on the inner surface of the clamping sleeve and at least two latch geometries are formed on the outer surface of the end portion of the first coupling part, wherein the latch geometries are arranged such, that in a first functional position of the clamping sleeve relative to the end portion of the first coupling part, only one of the latch geometries of the clamping sleeve is in engagement with one of the latch geometries of the end portion. In a second functional position of the clamping sleeve relative to the end portion of the first coupling part, the at least two latch geometries of the clamping sleeve are in engagement with the at least two latch geometries of the end portion. Exemplarily, it can be provided that at least three latch geometries are provided on the inner surface of the clamping sleeve and at least three latch geometries are formed on the outer surface of the end portion of the first coupling part.

Preferably there is a staggered arrangement of the respective at least three latch geometries to ensure a cascaded engagement of the individual latch geometries in the course of the relative movement between the clamping sleeve and the end portion.

The task of the clamping sleeve is to ensure, as a function of a relative rotational position of the clamping sleeve with respect to the end portion of the first coupling part, a frictional locking of the end portion of the second coupling part provided with the external thread on the first coupling part. In this connection, it is provided that the mutually corresponding latch geometries provided on the inner surface of the clamping sleeve and on the outer surface of the end portion of the first coupling part permit an adjustment of the clamping force as a function of a relative rotational angle between the clamping sleeve and the end portion of the first coupling part, in particular of radially inwardly acting forces which are exerted by the clamping sleeve on the end portion of the first coupling part and from there on the end portion of the second coupling part provided with the external thread. These radially inwardly acting forces, which may also be referred to as normal forces, cause the required frictional forces between the internal thread formed on the end portion of the first coupling part and the end portion of the second coupling part provided with the external thread, which normal forces act in a circumferential direction of the external thread and ensure the desired fixing of the second coupling part to the first coupling part.

For the provision of these radially inwardly directed normal forces, the inner surface of the clamping sleeve and the outer surface of the end portion of the first coupling part, which are directly opposite one another, each have latch geometries which are matched to one another in such a way that, in the event of a rotational relative movement of the clamping sleeve about the thread axis with respect to the end portion of the first coupling part, an increase or decrease in the normal forces occurs as a function of the selected direction of rotation. Preferably, the latch geometries are selected in such a way that a specific, for example in predetermined steps or stepless adjustment of the friction torque acting as a result between the first coupling part and the second coupling part is achieved.

A deviation of the respective latch geometry from a circular geometry can alternatively be realized by a projection projecting radially inward or outward or by a recess extending inward or outward in the radial direction.

Preferably, the clamping sleeve is dimensioned in such a way that it does not undergo any appreciable elastic or even plastic deformation during intended use. Particularly preferably, it is provided that on an outer surface of the clamping sleeve planar surfaces, also referred to as wrench surfaces, are realized in pairs in each case, which allow a user to introduce a torque for adjusting the rotational relative position of the clamping sleeve with respect to the end portion of the first coupling part using a suitable tool, in particular an open-end wrench. In particular, it is provided that additional wrench surfaces are provided at the end portion of the first coupling part adjacent to or spaced from the clamping sleeve so that a holding torque can be exerted by a user with a suitable tool, in particular an open-end wrench, when an adjustment of the rotational relative position of the clamping sleeve with respect to the end portion of the first coupling part is made. Alternatively, it may be provided that gripping surfaces are formed on the end portion and on the clamping sleeve, respectively, which enable the clamping sleeve to be adjusted manually and without tools. Preferably, it is provided that these gripping surfaces are provided with an anti-slip coating such as a rubber coating.

Advantageous further embodiments of the invention are the subject of the subclaims.

Advantageously, the first coupling part comprises a rod portion and a connecting portion, wherein the end portion of the first coupling part is formed on the connecting portion and wherein the connecting portion is screwed with an external thread into an internal thread of the rod portion. This realizes a modular structure of the coupling arrangement, in which an adaptation of the geometry, in particular of an overall length, of the coupling arrangement can be realized by replacing the rod portion. The connecting portion and the second coupling part are here independent of the geometry of the coupling arrangement and can thus each be provided as identical parts for the different designs of the coupling arrangement.

The rod portion can optionally be made from a solid material or from a tube and is provided at the end with the internal thread for receiving the external thread of the connecting portion.

For an advantageous adjustment of the forces acting in the radially inward direction, which are also referred to as clamping forces or normal forces, an at least substantially proportional relationship can be provided between a relative rotational angle assumed by the clamping sleeve relative to the end portion of the first coupling part and the resulting forces acting radially inward. This can be realized, for example, by designing the latch geometries as curved wedges, although high frictional forces may occur here between the clamping sleeve and the end portion of the first coupling part in the case of full-surface contact of the opposing latch geometries. Preferably, therefore, it is provided that the latch geometries are arranged in a circumferential direction of the inner surface of the clamping sleeve as well as in a circumferential direction of the outer surface of the end portion of the first coupling part in such a way that in a release position no appreciable clamping forces or normal forces are exerted by the clamping sleeve on the end portion of the first coupling part. During a rotational relative movement between the clamping sleeve and the end portion of the first coupling part into a first functional position, initially only one of the latch geometries of the clamping sleeve comes into an operative connection with the corresponding latch geometry of the end portion of the first coupling part, as a result of which an elastic deformation, at least in certain areas, of the end portion of the first coupling part is caused. This elastic deformation leads to the provision of a radially inwardly directed normal force or clamping force and thereby to the provision of a first frictional torque between the first coupling part and the second coupling part. If there is subsequently a further rotational relative movement between the clamping sleeve and the end portion of the first coupling part from the first functional position into a second functional position, the second pair of latch geometries of the clamping sleeve and the end portion of the first coupling part also comes into operative connection, causing an additional, area-wise elastic deformation of the end portion of the first coupling part. Accordingly, the normal forces acting in a radially inward direction from the first coupling part on the second coupling part increase and thus also the frictional torque between the first coupling part and the second coupling part. Depending on the configuration of the clamping sleeve and the end portion of the first coupling part, further pairings of latch geometries may be provided, which are preferably arranged in such a way that, starting from the second functional position, further rotational relative movements between the clamping sleeve and the end portion of the first coupling part can in each case cause an additional increase in the friction between the first coupling part and the second coupling part.

Preferably, the pairings of the latch geometries are designed in such a way that, after the occurrence of the operative connection in the respective functional position, they do not lead to a further increase in the respectively exerted clamping forces or normal forces when the clamping sleeve is pivoted from the respective functional position in the direction of the next functional position or functional positions. In particular, this is accompanied by a gradual increase in the clamping forces when the clamping sleeve is rotated relative to the end region of the first coupling part.

In a further embodiment of the invention, it is provided that the latch geometries on the inner surface of the clamping sleeve are formed as latch projections projecting radially inwards, preferably each formed with the same angular extension, in particular distributed at the same angular pitch. By way of example, the inner surface of the clamping sleeve is circular-cylindrical and the locking projections each have radially inwardly oriented locking surfaces. These locking surfaces can be designed as flat surfaces or as convex surfaces or as concave surfaces. Particularly preferably, it is provided that the latch projections are formed in the manner of short circular ring sections on the inner surface and the latch surfaces formed as a circular jacket section or as a conical jacket section define an inner diameter which is formed smaller than an inner diameter of the inner surface of the clamping sleeve.

Exemplarily, it is provided that an angular extent of the latch projections formed on the inner surface of the clamping sleeve is identical for all the latch projections formed on the inner surface of the clamping sleeve. This means that when the locking projections are viewed in a circumferential direction of the inner surface, an angle between a starting point of the respective locking projection and an end point of the respective locking projection, which angle is to be determined in this direction and relates to the center axis of the clamping sleeve, is identical for all locking projections. Alternatively one or more of the locking projections have a different angular extent. Supplementary or alternatively, it is provided that the latch projections are arranged at the same angular pitch with respect to the center axis of the clamping sleeve. For example, an angular pitch of 120 degrees is provided when three latch projections are realized. For example, an angular pitch of the latch projections may be 25 degrees.

In a further embodiment of the invention, it is provided that the latch geometries of the end portion of the first coupling part are determined by circular ring portions or by tapered ring portions each tapered on the outside in the direction of the rod portion and are provided with an internal thread for receiving the end portion of the second coupling part. Preferably, the latch geometries of the end portion of the first coupling part are aligned coaxially with each other and coaxially with the thread axis of the internal thread of the first coupling part.

The latch geometries of the end portion of the first coupling part can be produced, for example, by providing the regionally tubular end portion of the first coupling part with slots extending along the thread axis and aligned in the radial direction, these slots also improving a deformation behavior for the end portion of the first coupling part. By way of example, the latch geometry is determined here both by the outer surface of the tubularly formed end portion of the first coupling part and by the slots introduced therein.

In order to ensure an advantageous axial fixing for the clamping sleeve, it can be provided that the latch geometries of the end portion of the first coupling part are each realized as tapered ring sections with a cross-section that tapers in the direction of the rod portion. In this case, the locking surfaces of the locking projections and the inner surface of the clamping sleeve are preferably also formed as tapered ring sections. The clamping sleeve is mounted on the end portion of the first coupling part before the second coupling part is screwed into the first coupling part, so that the latch geometries of the end portion of the first coupling part can be elastically deformed to such an extent that the clamping sleeve can be pushed on despite its conical ring-shaped design. In the course of a subsequently provided screwing-in process for the second coupling part into the first coupling part, a renewed elastic deformation of the locking geometries of the end portion of the first coupling part is prevented by the end portion of the second coupling part provided with the external thread, at least to the extent that the clamping sleeve can be removed from the end portion of the first coupling part.

Preferably, it is provided that the latch geometries of the end portion of the first coupling part each have different angular extensions. This enables the desired sequential engagement of the respective mutually associated latch projections of the clamping sleeve and of the end portion of the first coupling part during a relative rotational movement between clamping sleeve and first coupling part.

It is advantageous if the latch geometries on the outer surface of the end portion of the first coupling part are formed as latch projections, preferably each formed with the same angular extension, in particular distributed at the same angular pitch, projecting radially outwards. This is the kinematic reversal of the inwardly projecting latch projections on the inner surface of the clamping sleeve. This applies in the same way to the design of the clamping sleeve, in which case it can be provided that the latch geometries on the inner surface of the clamping sleeve are formed as circular jacket sections, between which grooves aligned along the thread axis are formed.

Furthermore, a combination of inwardly projecting latch projections on the inner surface of the clamping sleeve and outwardly projecting latch projections on the outer surface of the end portion of the first coupling part is also possible.

In a further embodiment of the invention, it is provided that an end face of a latch geometry of the clamping sleeve, in particular of a latch projection, and a corresponding end face of a latch geometry of the end portion of the first coupling part form an end stop for a rotational movement of the clamping sleeve relative to the end portion of the first coupling part from the first functional position into a release position. This ensures that when the frictional connection between the first coupling part and the second coupling part is removed, the release position between the clamping sleeve and the end portion of the first coupling part can be reliably set, even under difficult assembly conditions.

It is convenient if a fork-shaped fastening portion is formed on the second coupling part and if a second coupling part is arranged on oppositely arranged end portions of the first coupling part, respectively. This allows the coupling arrangement to be used, for example, as a tie rod for fastening fairing parts or other components in an aircraft fuselage.

BRIEF DESCRIPTION OF DRAWINGS

An advantageous embodiment of the invention is shown in the drawing. Here shows.

DETAILED DESCRIPTION

Figure 1:
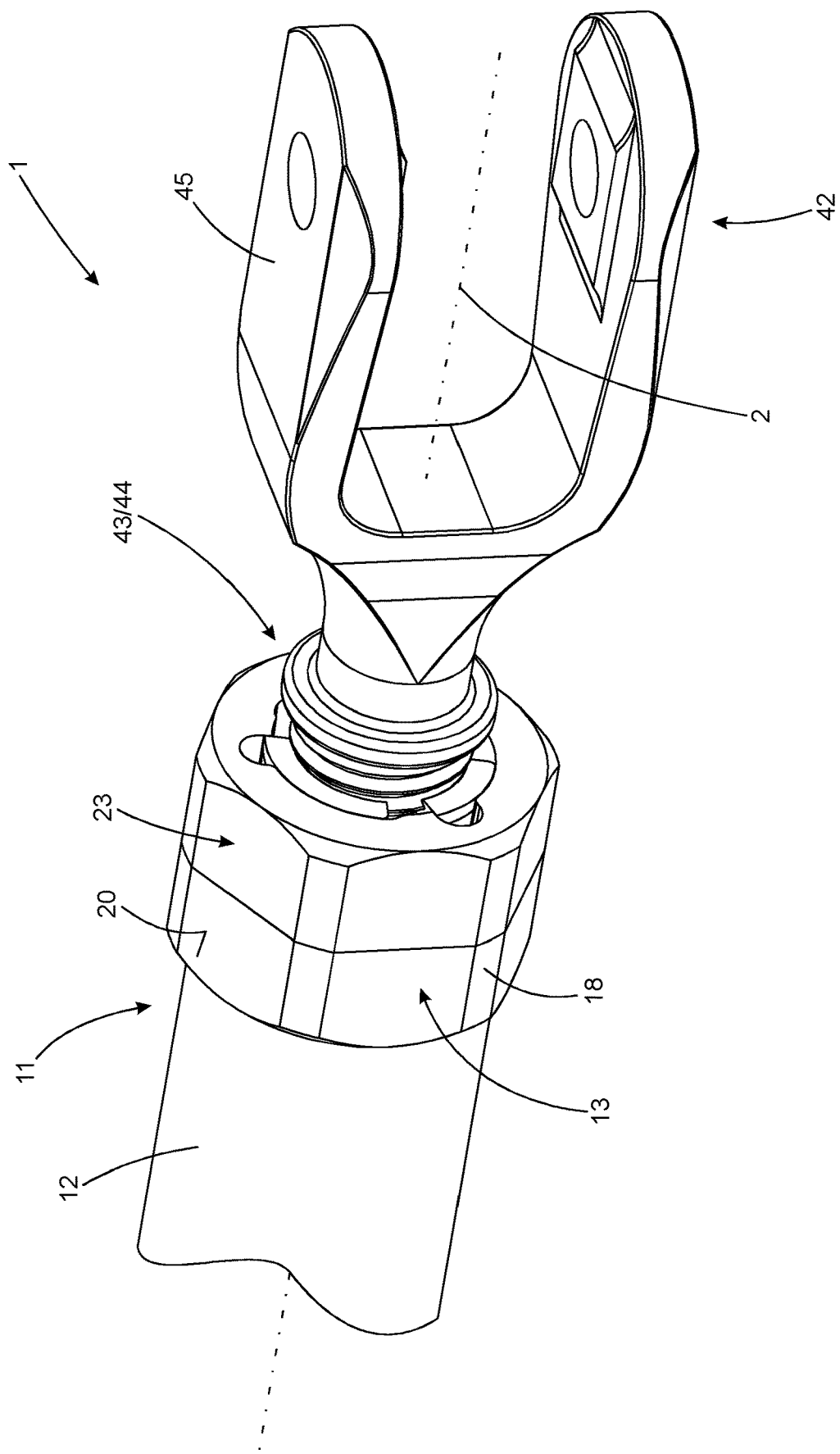
FIG. 1 a perspective view of a partial area of a coupling arrangement with a first coupling part and a second coupling part, FIG. 2 a sectional view of the partial area of the coupling arrangement according to FIG. 1, FIG. 3 a strictly schematic front view of a clamping sleeve, FIG. 4 a strictly schematic front view of a coupling part, and FIG. 5 a strictly schematic front view of the clamping sleeve mounted on the coupling part.

In a purely exemplary manner, a coupling arrangement 1 shown only in regions in FIG. 1 comprises a first coupling part 11 and a second coupling part 42 attached thereto. Exemplarily, the same combination of a first coupling part and a second coupling part may be provided at a second end region of the coupling arrangement 1, whereby the coupling arrangement 1 may be used, for example, as a tie rod for fastening components, for example fairing parts, in an aircraft fuselage.

Figure 2:
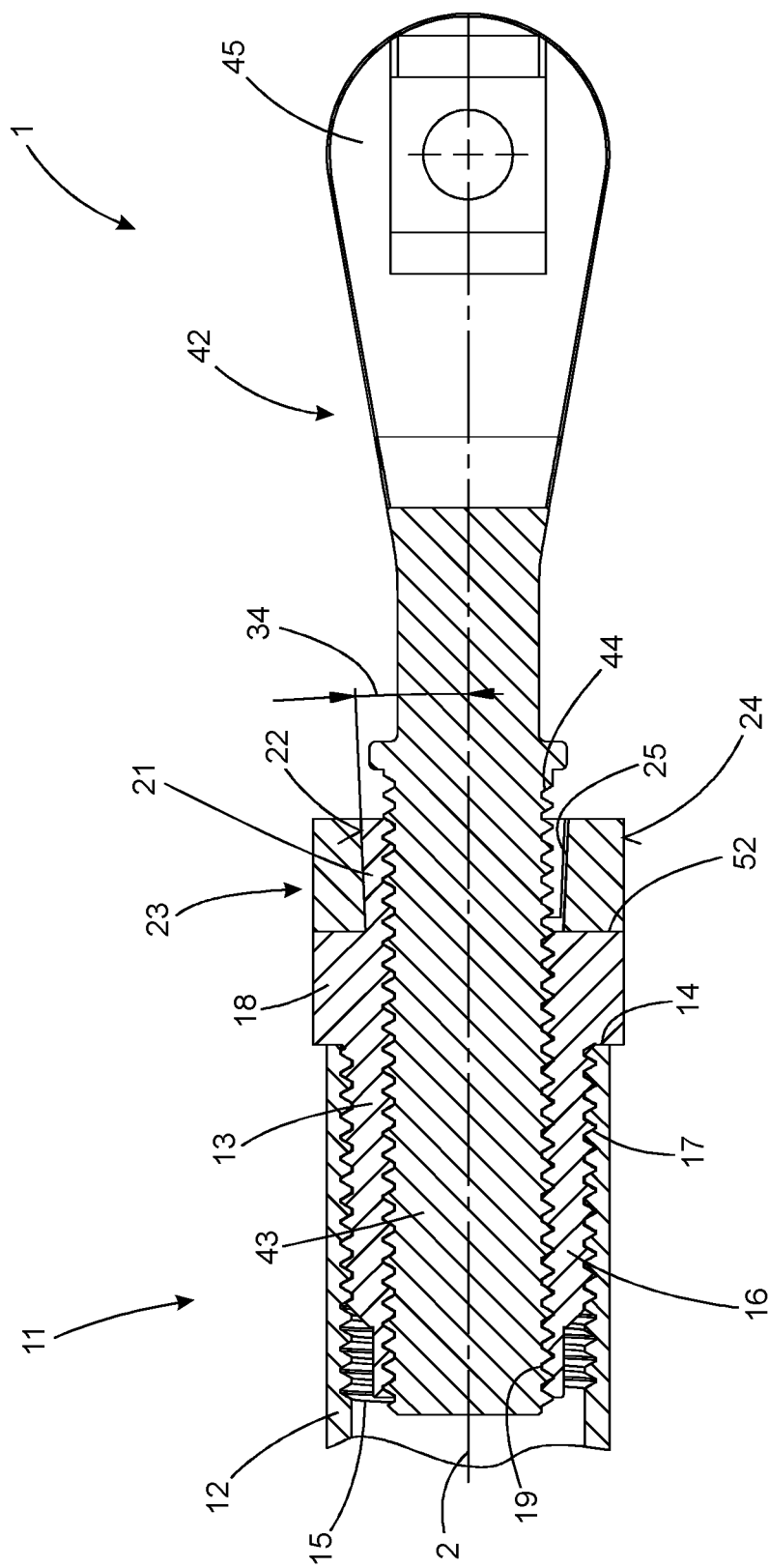

According to the illustration of FIG. 2, the first coupling part 11 comprises a rod portion 12 of purely exemplary tubular design and a connecting portion 13 coupled to the rod portion 12. By way of example, it is provided that the rod portion 12 is provided with an internal thread 15 starting from a mouth opening 14 along a thread axis 2, which is preferably the central axis of the rod portion 12. A threaded portion 16 of the connecting portion 13 is screwed into this internal thread 15 and, for this purpose, has an external thread 17 which extends along the thread axis 2 as far as an end collar 18 of the connecting portion 13. Furthermore, the connecting portion 13 is completely penetrated by an internal thread 19.

According to the illustration of FIG. 1, the end collar 18 is profiled in the manner of a hexagon nut and accordingly has a total of three pairs of planar surfaces, each aligned parallel to one another, of which only one is provided with the reference sign 20 for reasons of clarity. An end portion 21 of the first coupling part 11 is formed at an end region of the connecting portion 13 remote from the external thread 17. As can be seen from the illustration of FIG. 2, the end portion 21 is profiled as a tapered portion, wherein a taper of the end portion 21 is provided in the direction of the end collar 18.

On an outer surface 22 of the end portion 21, which is formed as a tapered section with a taper angle 34, which is for example 3 degrees, a clamping sleeve 23 is received so as to be rotatable about the thread axis 2. As can be seen from the representation of FIG. 1, an outer surface 24 of the clamping sleeve 23 is formed in the manner of a hexagonal nut, in particular of the same type as the end collar 18. An inner surface 25 of the clamping sleeve 23, visible in FIG. 2, is adapted to the outer surface 22 of the end portion 21 and is also profiled in the shape of a tapered portion.

In purely exemplary embodiment, the second coupling part 42 comprises an end portion 43 provided with an external thread 44 extending along the thread axis 2, the external thread 44 being adapted to the internal thread 19 as realized in the connecting portion 13. Adjacent to the end portion 44, the second coupling part 42 is provided with a connecting fork 45 configured for fixing the second coupling part 42 to an attachment eye of a structural member, for example a fairing member of an aircraft.

Figure 3:
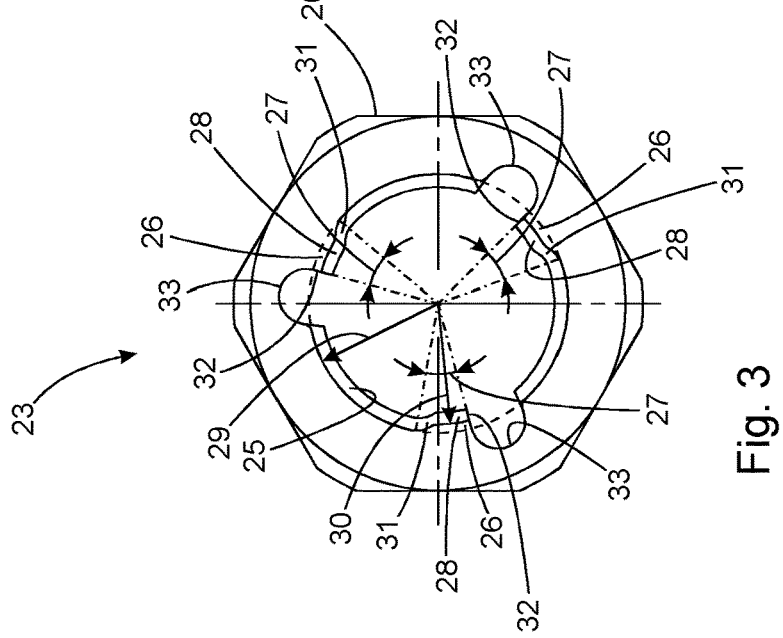

As can be seen from the purely schematic representation of the clamping sleeve 23 shown in FIG. 3, the inner surface 25 is formed in the manner of a tapered skirt portion. In purely exemplary fashion, a total of three latch geometries formed as latch projections 26 project inwardly in the radial direction from the inner surface 25. By way of example, it is provided that the latch projections 26 are each arranged at the same angular pitch, in this case an angular pitch of 120 degrees. Furthermore, it is provided purely exemplarily that each of the latch projections 26 has an angular extension 27 which is identical to the angular extensions 27 of the other latch projections 26 and is for example 25 degrees.

Each of the latch projections 26 has a radially inner latch surface 28 which, by way of example, is formed as a conical surface section in the same manner as the inner surface 25. Exemplarily, it is provided that the latch surface 28 has a radius 30 which is almost constant over the entire angular extent 27 and is adapted to the radius 29 of the inner surface 25 only in a transition region 31. In the illustration of FIG. 3, the largest radius for the inner surface 25 and the locking surface 28 are shown. Each of the latch projections 26 has a circumferentially aligned end face 32, which is formed by a radial recess 33 and which are used as stop faces for the corresponding latch geometries of the connecting portion 13, as will be explained below in connection with FIG. 5.

Figure 4:
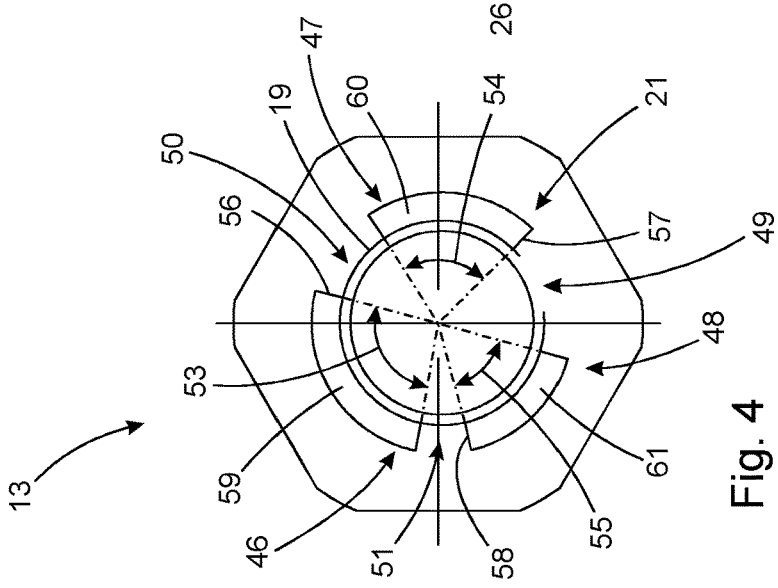

The connecting portion 13 shown schematically in FIG. 4 is provided, purely by way of example, with three latch geometries 46, 47, 48. These latch geometries 46, 47, 48 can be created, for example, by providing an end portion 21 of the connecting portion 13, which is initially tubular with an outer surface 22 in the form of a taper section, with slots 49, 50, 51 which extend from an end surface 52 of the connecting portion 13 designated in FIG. 2 to the end collar 18. This leaves three tapered ring sections 59, 60, 61 which, together with the slots 49, 50, 51, form the latch geometries 46, 47, 48. Purely by way of example, the slots 49, 50, 51 are designed in such a way that the latch geometries 46, 47 and 48 formed thereby each have different angular expansions 53, 54, 55.

Figure 5:
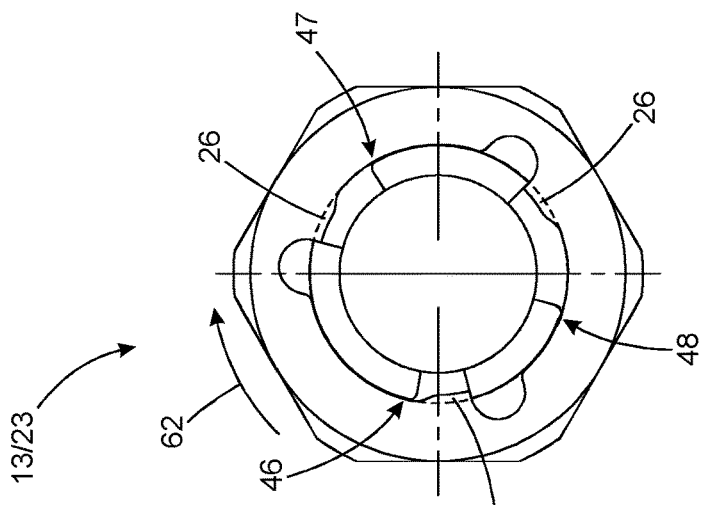

This different design of the latch geometries 46, 47 and 48 of the connecting portion 13 and the similar design of the latch projections 26 on the clamping sleeve 23 ensure that, during a rotational relative movement of the clamping sleeve 23 with respect to the connecting portion 13 in the direction of rotation 62, starting from the release position shown in FIG. 5, initially only one of the latch projections 26 interacts with the corresponding latch geometry 46. The other two latch projections 26, on the other hand, do not initially come into operative connection with the corresponding latch geometry 47 or 48 due to the different angular extent 53, 54, 55 of the latch geometries 46, 47 and 48. The operative convection of the latch projection 26 with the latch geometry 46 results in a displacement movement in which the latch projection 26 displaces the latch geometry 46 inward in the radial direction and elastically deforms it thereby. This causes a radially inwardly directed compressive force, which can also be referred to as a normal force or latch force, to be exerted by the latch geometry 46 on the external thread 44 of the end portion 43 of the second coupling part 42. This increases frictional forces between the second coupling part 42 and the first coupling part 11, thereby increasing a braking effect for relative movements between the second coupling part 42 and the first coupling part 11.

During a further rotational relative movement, the other latch projections 26 also gradually come into operative connection with the latch geometries 47 and 48, as a result of which an additional force is introduced from the clamping sleeve 23 to the latch geometries 47 and 48 and thus also to the external thread 44 of the end portion 43 of the second coupling part 42.

Insofar as a relative movement between the second coupling part 42 and the first coupling part 11 is to be carried out after the second coupling part 42 has been fixed to the first coupling part 11, the locking effect between the clamping sleeve 23, the connecting portion 13 and the external thread 44 can optionally be maintained or reduced or cancelled. For this purpose, a rotational relative movement is introduced onto the clamping sleeve 23 against the rotational direction 62 drawn in FIG. 5, which is opposite to the rotational relative movement for effecting the fixing, so that sequentially or cascaded the operative connection between the locking projections 26 and the locking geometries 48, 47 and 46 is cancelled again. In order to ensure a clear rotational relative position for the clamping sleeve 23 in the release position, the latch geometries 46, 47 and 48 are matched to the latch projections 26 in such a way that, in the release position, a form-fitting abutment of side surfaces of the tapered ring sections 59, 60, 61 against the end surfaces 32 of the latch projections 26 is ensured, as can be seen from FIG. 5.

The invention claimed is:

1. A coupling arrangement for connecting components, comprising a first coupling part to be fixed to a first component, and a second coupling part to be fixed to a second component, wherein an end portion of the first coupling part is provided with an internal thread extending along a thread axis, and wherein an end portion of the second coupling part is provided with an external thread extending along the thread axis, which external thread of the second coupling part is screwed into the internal thread of the first coupling part, wherein a clamping sleeve is rotatably received on an outer surface of the end portion of the first coupling part, wherein an inner surface of the clamping sleeve and the outer surface of the end portion of the first coupling part each have latch geometries which deviate from a circular geometry and correspond to one another in a cross-sectional plane aligned transversely to the thread axis, to provide, during a rotational movement of the clamping sleeve relative to the end portion of the first coupling part, an at least regionally elastic or elastic and plastic change in diameter of the end portion of the first coupling part for clamping the end portion of the second coupling part, wherein at least two latch geometries are formed on the inner surface of the clamping sleeve and wherein at least two latch geometries are formed on the outer surface of the end portion of the first coupling part, the latch geometries being arranged in such a way that in a first functional position of the clamping sleeve relative to the end portion of the first coupling part only one of the latch geometries of the clamping sleeve engages with one of the latch geometries of the end portion of the end portion of the first coupling part, and wherein, in a second functional position of the clamping sleeve with respect to the end portion of the first coupling part, the two latch geometries of the clamping sleeve are in engagement with the two latch geometries of the end portion of the first coupling part.

2. The coupling arrangement according to claim 1, wherein the first coupling part comprises a rod portion and a connecting portion, wherein the end portion of the first coupling part is formed on the connecting portion and wherein the connecting portion is screwed with an external thread into an internal thread of the rod portion.

3. The coupling arrangement according to claim 1, wherein the latch geometries on the inner surface of the clamping sleeve are formed as latch projections projecting radially inwards.

4. The coupling arrangement according to claim 3, wherein the latch geometries of the end portion of the first coupling part are determined by circular ring sections or by tapered ring sections tapered in each case on the outside in the direction of the rod portion and are formed with an internal thread for receiving the end portion of the second coupling part.

5. The coupling arrangement according to claim 4, wherein the latch geometries of the end portion of the first coupling part each have different angular extensions.

6. The coupling arrangement according to claim 1, wherein the latch geometries on the outer surface of the end portion of the first coupling part are designed as latch projections projecting radially outwards.

7. The coupling arrangement according to claim 6, wherein the latch geometries on the inner surface of the clamping sleeve are formed as circular jacket sections, between which grooves aligned along the thread axis are formed.

8. The coupling arrangement according to claim 1, wherein an end face of a latch geometry of the clamping sleeve and a corresponding end face of a latch geometry of the end portion of the first coupling part form an end stop for a rotational movement of the clamping sleeve relative to the end portion of the first coupling part from the first functional position into a release position.

9. The coupling arrangement according to claim 1, wherein a fork-shaped fastening portion is formed on the second coupling part and wherein a second coupling part is arranged on oppositely arranged end portions of the first coupling part in each case.

* * * * *